Jan. 3, 1967  C. G. KELSEY  3,295,210

DRAUGHTING DATA PROCESSING MACHINE

Filed March 4, 1965  6 Sheets-Sheet 1

INVENTOR.
CHRISTOPHER G. KELSEY
BY
Oldham & Oldham
ATTYS.

Jan. 3, 1967 C. G. KELSEY 3,295,210
DRAUGHTING DATA PROCESSING MACHINE
Filed March 4, 1965 6 Sheets-Sheet 2

INVENTOR.
CHRISTOPHER G. KELSEY
BY Oldham & Oldham
ATTYS.

Jan. 3, 1967  C. G. KELSEY  3,295,210
DRAUGHTING DATA PROCESSING MACHINE
Filed March 4, 1965 6 Sheets-Sheet 5

INVENTOR.
CHRISTOPHER G. KELSEY
BY Oldham & Oldham
ATTYS.

Jan. 3, 1967  C. G. KELSEY  3,295,210
DRAUGHTING DATA PROCESSING MACHINE
Filed March 4, 1965  6 Sheets-Sheet 6

INVENTOR.
CHRISTOPHER G. KELSEY
BY
*Oldham & Oldham*
ATTYS.

United States Patent Office 3,295,210
Patented Jan. 3, 1967

3,295,210
DRAUGHTING DATA PROCESSING MACHINE
Christopher G. Kelsey, Glenalta, South Australia, Australia, assignor to Data Resolved Tools Pty. Ltd., Adelaide, South Australia, Australia
Filed Mar. 4, 1965, Ser. No. 437,064
Claims priority, application Australia, Mar. 24, 1964, 42,462, 42,463; Sept. 30, 1964, 49,967
15 Claims. (Cl. 33—18)

This invention relates to a machine of a new type which can be used for processing drafting data from a drawing.

When drawings are made from models, the drawings are usually presented in three planes which are normally termed the $x$–$y$ plane, the $x$–$z$ plane, and the $y$–$z$ plane, and according to convention the $x$–$y$ plane is considered to be horizontal and in orthographic projection is the plane which is considered to be the plan view of an object, the $x$–$z$ plane is considered to be vertical and orthographic projection is considered to be the plane which is viewed in elevation, while the $y$–$z$ plane is also considered to be vertical but at right angles to the $x$–$z$ plane and is the plane which is viewed in end elevation. However, the drawings as prepared in this form are not useful for working, and in most cases it is necessary to "tip" the drawings about at least one axis, and frequently about a pair of axes. This is a time consuming and tedious job which requires a great deal of interpolation between points, and in normal practice it is found that drawings which have been "tipped" are incorrect and inaccurate due to the number of steps required.

An object of this invention therefore is to provide means whereby it is possible to obtain a third (tipped) view from two views of a drawing, the third view being tipped about at least one pair of axes.

It is already known to machine blanks, cams, dies or the like from a punched tape wherein an interpolator is inserted between the punched tape and the machine tool, thereby interpolating curves between points which are fixed by the punchings on the tape. A similar system also uses magnetic tapes, but employs the same general principles. A machine of the type using punched tapes, for example, is described in the April issue, 1956, of the British publication entitled "Aircraft Production" under the heading "Analogue Control," by Peter J. Farmer, A.F.R.A.E.S. As pointed out by the author in that publication, the usual production sequence begins with a production planning engineer who receives the drawing of the part to be manufactured, and converts the dimensional information into the form required by the control system. The program stage defines the locus which the cutter must trace by calculating the $x$ and $y$ co-ordinates through which the cutter must pass. This data is set out in tabular form and is handed to a typist who prepares the punched paper tape (or the magnetic tape if this type of control is used in lieu of the punched tape) and the tape provides the necessary command signals to the machine through an interpolator. However, the set up time for preparing a tape is very considerable, and this method of manufacture is not favoured except for production runs, or where great accuracy of intricate shape is desired.

For general tooling purposes in automotive and aircraft work, and other similar industries, the savings have not been sufficient to encourage manufacturers to employ this type of control.

With the inaccurate drawings which have been deduced by the manual preparation of "tipped" drawings it has quite clearly not been feasible to provide encoding means wherein the data is taken directly from drawings, other than in exceptional cases where the drawings are known to be accurate.

A further object of the invention therefore is to provide means whereby information can be taken direct from orthographic views as prepared, and can be directed to an encoder which will enable command signals to be stored, for example on punched or magnetic tape.

In many industries where orthographic drawings are made of panels or the like it is usual to loft the model in two planes only and to prepare the end elevation, for example, of a panel from information which appears on the other two views. It is usual to relate the datum points to a grid which in the automotive industry is usually a grid of five inch cubes. However, many human errors are introduced and this causes expensive wastage of valuable tool-making time when the third views are inaccurate, and a still further object of this invention is to provide means whereby it becomes possible to prepare a third view by rotating one of two orthographic views through 90° and through 0°. (Rotation through 0° is an essential for the third view having regard to the algebraic expressions of this invention, since it is necessary to resolve distance in analogue form from both input views.)

In the embodiment described below, it will become apparent that this object cannot be achieved with the simple mechanical drafting machine capable of rotating in one view at a time only. It is necessary for the rotation of the views to be simultaneous to obtain analogous lines.

A drafting data processing machine according to this invention comprises a surface, a pair of tracer means, the tracer means and surface being movable relative to each other, a resolver operatively coupled to each of the tracing means and arranged to transmit a proportion of tracer movement, means coupling the output of the resolvers in an algebraic sum or difference, and print-out means operable in response to the sum or difference.

The surface is conveniently planar and that of a table to which a drawing can be secured, and in use the orthographic views of a drawing are secured to a table with their common axes extending in one direction. The tracer means can for example be constituted by a pointer or by a microscope containing cross hairs, manually operated to follow a line. The resolver can be any one of a plurality of types, including a simple arm which transmits a trigometric proportion only of the tracer movement, the arm operating as a lever or on a "similar triangle" principle wherein a simple lever is pivoted at its ends to secondary arms which are themselves guided along a rod or bar. Alternatively the resolver may be a ball type resolver, or can if desired be an electronic resolver.

The means coupling the output transmitted by the resolvers can vary widely, and in the case of a mechanical drafting machine can constitute simple links, while in the case of an electronic device these means can be constituted by an electrical connection. The print-out means will also vary in accordance with requirement and can for example consist of a print-out pen which is either continuously or intermittently in contact with a sheet of drawing paper, or the print-out means can be constituted by an encoder for the punching of tape or by an encoder for the magnetising of a magnetic tape.

The method according to the invention of processing data from a pair of drawing views comprises the steps of moving a pair of spaced tracers over the views to follow the lines of the views, resolving the movement of one of the tracers to a proportion which corresponds to the sine of an angle A resolving a movement of the other of the tracers to a proportion which corresponds to the cosine of the angle A, algebraically adding the resolved movement in accordance with the formula $$(\pm x \text{ sine } A + y \cos A) \text{ or } (+x \cos A \pm y \text{ sine } A)$$

and printing out the said algebraic addition.

The method can conveniently include the coupling together of the two tracers so that they move simultaneously by the same amount in the direction of one common axis while they are moved over the views to follow the lines of the views in the direction of the other two axes respectively which are not common (in the case of orthographic projection). The resolving of the movement of the tracers of course is conveniently done automatically, and this can be effected either by links, by ball type resolvers or electronically. The reference to the X and Y axes of course is not intended to limit the method to use on these two axes only, as quite clearly any set of axes can be rotated in space relative to a set of orthographic axes so that the designation of X and Y can relate to the axis which is conventionally known as the "Z" axis. Furthermore, the printing out of the algebraic addition can also be effected automatically, for example by utilising a pen passing over a sheet of paper, or by encoding the information in terms of co-ordinate distances and transmitting the information on to a punched tape or a magnetic tape with encoders of known type.

Two embodiments of the invention are described hereunder in some detail but it will become clear that the invention need not be limited to the details of these two embodiments. The first of the described embodiments relates to a mechanical drafting machine, while the second relates to a machine wherein the data is transmitted electrically.

Figure 1:
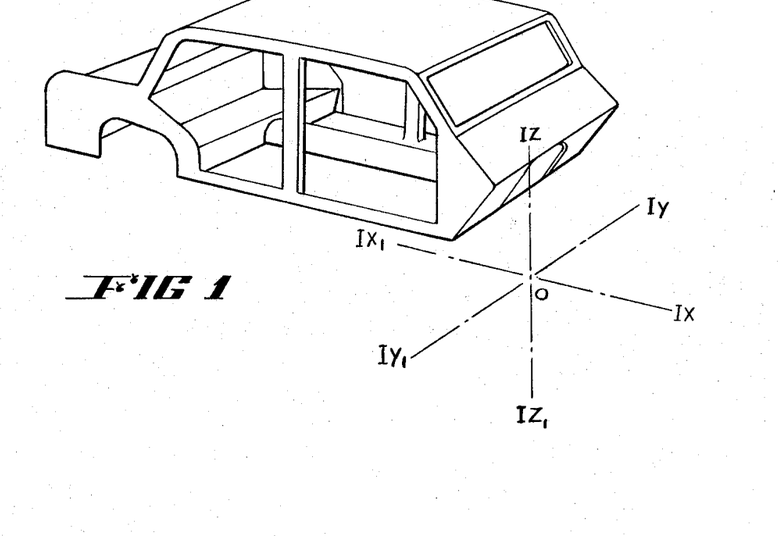
FIG. 1 shows the sense in which the orthographic axes are referred to throughout the specification, although of course the X, Y and Z axes can be transposed.
Figure 2:
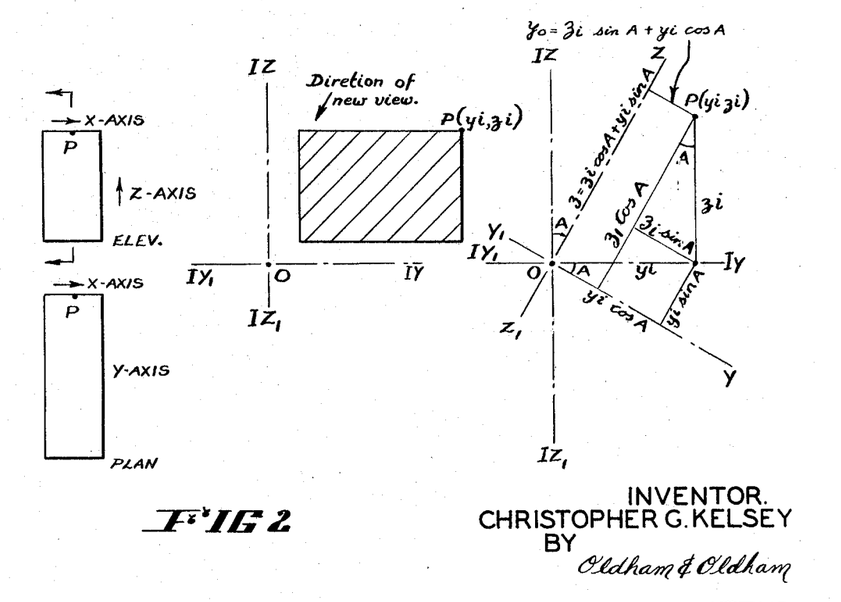
FIG. 2 illustrates graphically how the co-ordinates of a point may be resolved into a formula of the type $y_o = z_i \text{ sine } A + y_i \cos A$ and $z_o = z_i \cos A + y_i \text{ sine } A$.

Referring first to the repositioning of the base which is required for "tipping" a drawing, or information from the drawing so it is represented in respect of a new set of axes, FIG. 1 shows the conventional axes (designated I for input) $IX_1$–O–$IX_1$, $IY_1$–O–$IY_1$ and $IZ_1$–O–$IZ_1$. FIG. 2 illustrates an elevation in plan of a rectangular block, wherein the X axis is common to both views, the elevation showing also the Z axis and the plan showing also the Y axis. A point P is shown in the elevation relative to the X and Z axes and in plan view relative to the X and Y axes. In the section shown, the point P has the initial co-ordinates P ($y_i z_i$).

For the purpose of this embodiment it is assumed that the axes are rotated about the $IX_1$–O–$IX_1$ axis by an angle A and in a clockwise direction. It will immediately be seen from FIG. 2 that the co-ordinates ($xyz$) (related to the new axes $OY_1$–O–OY and $OZ_1$–O–OZ) become $x_o = x_i$; $y_o = -z_i \text{ sine } A + y_i \cos A$, while $z = z_i \cos A + y_i \text{ sine } A$.

It can also be shown in a similar manner that for a second tip about, say, the $OY_1$–O–OY axis (a new or output axis from the first tip), the co-ordinates become $$x_o = -(z_i \cos A + y_i \text{ sine } A) \text{ sine } B + x_i \cos B$$
$$y_o = -z_i \text{ sine } A + (y_i \cos A)$$

while $$z_o = (z_i \cos A + (y_i \text{ sine } A) \cos B + x_i \text{ sine } B)$$

However, for the purpose of the following embodiments, three families of equations are made applicable, and these are set out hereunder:

$z = z_i \cos A + y_i \text{ sine } A$
$y = -z_i \text{ sine } A + y_i \cos A$
$x = x_i$ $z_o = z \cos B + x \text{ sine } B$
$y_o = y$
$x_o = -z \text{ sine } B + x \cos B$ $z = z_o \cos B - x_o \text{ sine } B$
$y = y_o$
$x = z_o \text{ sine } B + x_o \cos B$ The suffix $i$ is intended to relate to the input signal while the suffix $o$ is intended to relate to the output signal.

Figure 3:
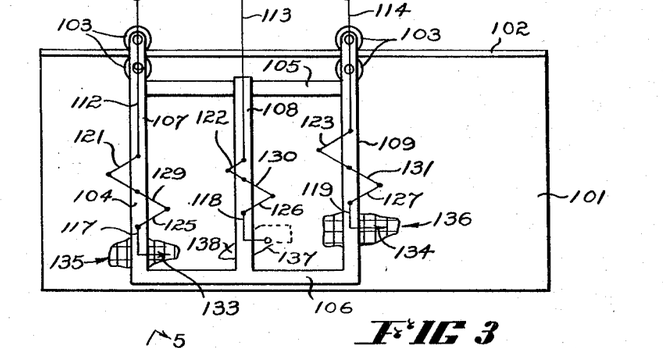
FIG. 3 illustrates diagrammatically a plan view of a mechanical drafting data processing machine wherein a resolver is constituted by a linkage mechanism working on a "similar triangle" principle.
Figure 4:
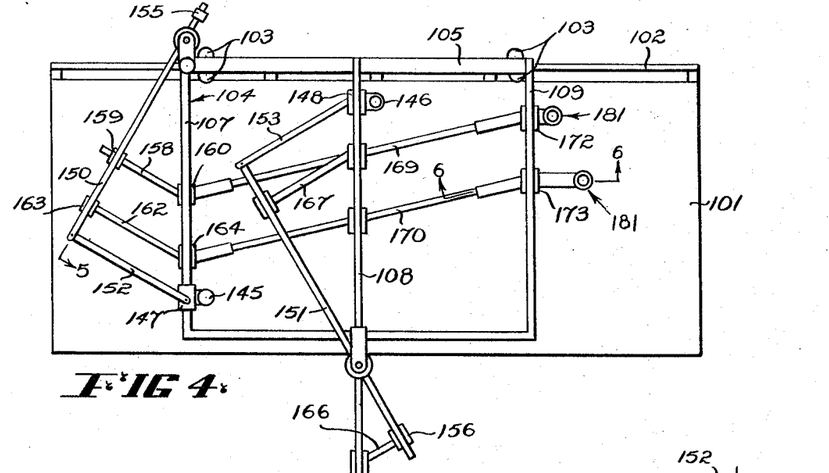
FIG. 4 illustrates a practical machine utilising the principles shown in FIG. 3 but reduced in table size.
Figure 5:
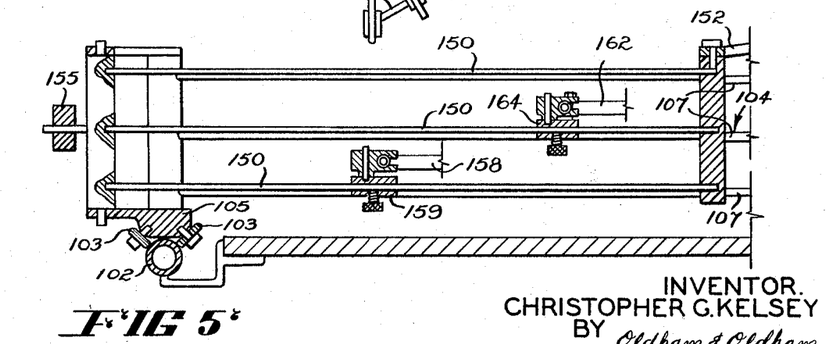
FIG. 5 is a section on line 5—5 of FIG. 4.
Figure 6:
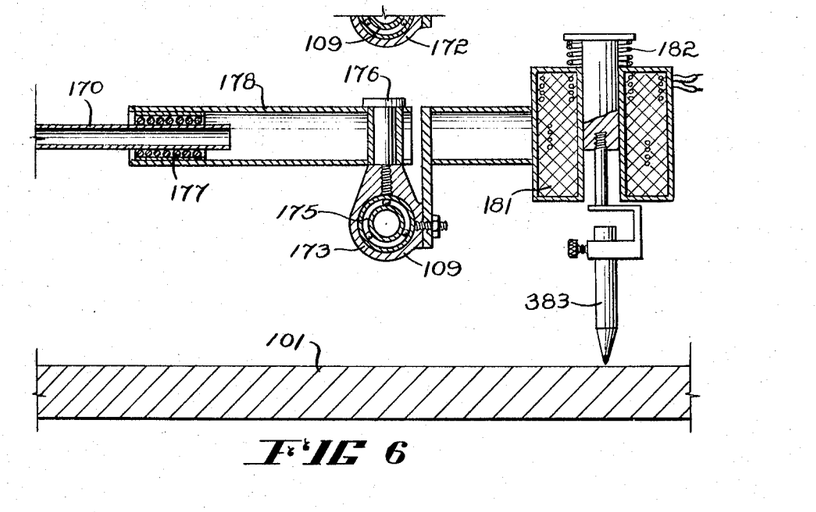
FIG. 6 is a section on line 6—6 of FIG. 4.

Referring now to the first embodiment which is diagrammatically illustrated in FIG. 3 and which is shown in more detail in a practical form in FIGS. 4, 5 and 6, a drafting board 101 has an upper track 102 extending along its upper horizontal edge, and this is engaged by wheels 103 on a support frame 104. The support frame 104 is in the form of a grid having two horizontal members 105 and 106 and three vertical members 107, 108 and 109 in each case (FIGS. 3 and 4).

Referring now to FIG. 3, the upper ends of the vertical members 107, 108 and 109 guide for relatively parallel movement three secondary axially movable rods 112, 113 and 114 respectively. The lower ends of these vertical members similarly guide three primary axially movable rods 117, 118 and 119 respectively.

The lower ends of the secondary axially movable rods 112, 113 and 114 are pivoted to secondary control arms 121, 122 and 123 respectively. In a similar manner, the upper ends of the primary axially movable rods 117, 118 and 119 are pivoted to primary control arms 125, 126 and 127 respectively. Three pivoted links 129, 130 and 131 respectively join the rods 121 and 125, 122 and 126, and 123 and 127, the first and the last having the pivotal points adjustable along the links 129 and 131 respectively. The control arms 121 and 123 also are adjustable to maintain similar triangles as shown in the drawings. To avoid the print-out being double scale along the Y=axis, the link 130 is divided in a two to one ratio.

Each of the primary axially movable rods 117 and 119 carry pointers 133 and 134 respectively, and in use these pointers are moved to follow the lines of an elevation 135 of a drawing, and a plan 136 of the drawing. Other views of course may be used. The primary axially movable rod 118 carries on it a print-out pen 137 which will trace out a "tipped" view 138. The pivoted link 130 is multiplied in a two to one ratio so that the addition or difference of movement of the pointers 133 and 134 does not result in a half scale co-ordinate of the drawing 138 of the "tipped" view in a vertical direction.

A connecting lever 140 is pivoted to the upper end of the axially movable rod 113 and engages between rollers 141 which are disposed on the projecting ends of the secondary axially movable rods 112 and 114. Thus, it will be seen that if the link 129 constitutes a resolver set to read out the sine of movement along the Z axis, and the link 131 is arranged to resolve the Y axis movement into a fraction corresponding to the cosine of the angle of tip, then the print-out pen 137 will move in accordance with the first family of equations referred to above, since quite clearly the X movement remains the same for the "tipped" view 138 as for the elevation 135 and the plan 136. That is, the print-out pen 137 will move vertically by the distance $-z \sine A + y \cos A$, A being the angle of tip.

The above drafting data processing machine has been proven practically to be satisfactory, but it will be seen that the size of the drafting board 101 is very large, and the more detailed embodiment of FIGS. 4, 5 and 6, although making use of identical principles, nevertheless has the drafting board 101 much reduced in size. Referring now to FIGS. 4, 5 and 6, the drafting board 101 has an upper track 102 as before, and also has a support frame 104 with horizontal members 105 and 106 and vertical members 107, 108 and 109. However, in this embodiment there are three vertical members in each bank of vertical members 107 and 108, and two vertical members in the bank of vertical members 109. In this case pointers are not used, but microscopes 145 and 146 are carried on slidable read-off saddles 147 and 148 respectively, these slidable saddles being slidable on the members 107 and 108 respectively. Again use is made of the "similar triangle" principle, but in this case the secondary control arm is constituted by a bank of rods 150 for one view and a bank of rods 151 for the other view, while the primary control arm is constituted by a single link 152 for a first view and 153 for a second. The primary link 152 is pivoted at its ends to the slidable read-off saddle 147 and the secondary control arm 150, and similarly the primary control arm 153 is pivoted at one end to a further slidable saddle 148 and at the other end to the secondary control arm 151. The weight of this mechanism is counter balanced by counter balance weights 155 and 156 respectively.

An inner pivoted arm 158 is pivoted at one end to an adjustable sleeve 159 on the secondary control arm 150, and at its other end on a slidable saddle 160 which moves along one of the members 107. Similarly an outer pivoted arm 162 is pivoted on a sleeve 163 at one end and a slidable saddle 164 at the other end.

The second group of vertical members 108 has a similar pair of arms designated 166 and 167 respectively, and these pivoted arms are pivotally interconnected with the pivoted arms 158 and 162 by means of the telescopic rods 169 and 170. The ratio of lengths of 158 to 152 is half 167 to 153, also 162 to 152 is twice 166 to 153, in order to maintain a 1:1 scale in all directions. The connection is between an inner pivoted arm at one end and an outer pivoted arm at the other end in each case. The telescopic rods 169 and 170 progress outwardly to output slidable saddles 172 and 173 respectively, these saddles 172 and 173 being slidable on the members 109. The arm 166 is positioned outside the "triangle" of 108, 151 and 153 in order to place the movements of saddles 172 and 173 in adjacent Cartesian co-ordinate quadrants, thus providing two views of an article at right angles to each other. FIG. 6 illustrates the mechanism which includes a ball bushing 175 constituting the slidable saddle slidable over the rod 109, the pivot pin 176 constitutes a pivotal means, while the ball bushing 177 enables the telescopic rod 170 to move in and out relative to the sleeve 178.

Each saddle 172 and 173 carries on it a solenoid 181 which contains a spring loaded armature 182 to which is attached a print-out pen 183. Similarly the end of the telescopic rod 169 has a second print-out pen (not shown).

It will be seen that the embodiments of FIGS. 4, 5 and 6 are generally similar to the embodiment of FIG. 3, but both a plan and elevation "tipped" view can be printed out from a plan and elevation input view traced by the microscopes 145 and 146 respectively. A simple modification to the embodiment of FIG. 3 will enable this also to print out a plan and elevational view. Thus it will be seen that one of the three families of equations referred to above can be satisfied, wherein the angle of tip is about one axis only.

It is to be seen that a natural extension of the above embodiments will provide means for tipping about two angles simultaneously, and thus for example obtaining an end elevation from a plan and an elevation when the angle of tip is adjusted to 90 degrees and zero. However, the mechanical linkage becomes somewhat complex to achieve this, and it becomes desirable to utilise an electrical system wherein the adding of, for example, $x_i \cos A$ and $y_i \sine A$ can be by a simple superimposition of voltages one upon the other. It will be noted that the family of equations referred to above referred to rotation through an angle A about the $X_1-O-X$ axis and an angle B about the $Y_1-O-Y$ axis.

Figure 7:
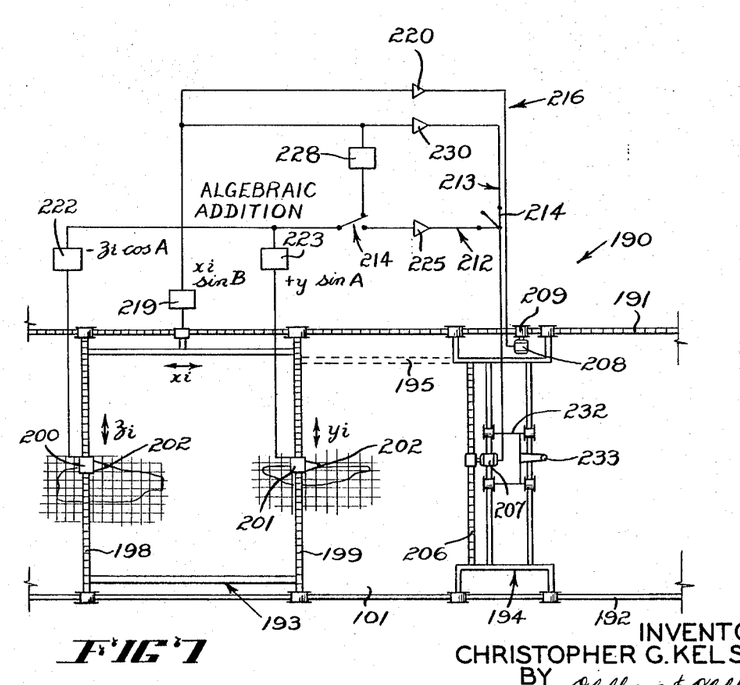
FIG. 7 shows somewhat diagrammatically a simple form of electrical signal means.

FIG. 7 illustrates in its simplest form a drafting data processing machine wherein a single "tip" is obtained electrically, or alternatively wherein a "tip" is obtained about two axis ($X_1-O-X$ and $Y_1-O-Y$), although FIG. 7 is shown with a single read-out wherein the print-out is taken on one view only. The extension of the embodiment of FIG. 7, as shown in FIGS. 8 to 12 inclusive, illustrates a device wherein a double read-out is obtainable.

According to FIG. 7, a drafting machine 190 has an upper horizontal rack 191 which forms also an upper track, and a lower horizontal track 192, the machine having a tracing carriage 193 and a printing carriage 194. There is a releasable tie (shown dotted) 195 between the tracing carriage 193 and the printing carriage 194, but this is utilised only in the event that a single "tip" is required, and if more than one "tip" is required, the releasable tie is then removed, since quite clearly the length of the print-out view will be different from the length along the common X axis of the plan and elevation.

The tracing carriage 193 has a vertical rack 198 on one side, being No. 1 vertical rack, and a vertical rack 199 (being No. 2 vertical rack) on the other side, each of these racks including a precision track which engaged by respective sub-carriages 200 and 201, while the racks 198 and 199 are engaged by spring loaded teeth on a pinion (not shown) journalled to each sub-carriage and coupled to a potentiometer or synchro of high accuracy. Each sub-carriage carries on it a tracer 202 in the form of a length of metal having a point at its lower end. The tracers 202 are adapted to be moved over two views of a drawing.

The tracing carriage 193 also has on it a synchro (not shown) or a travel potentiometer which is direct coupled to a spring tooth pinion (also not shown) which engages the upper horizontal rack 191.

The second carriage 194 is a printing carriage and this may be used either for direct printing on to a plane sheet or for driving an encoder to process data onto a magnetic or punched tape storage system. In the example of FIG. 7, the former only is shown, but in the subsequent example of the electrical embodiment shown in FIGS. 8 to 12 inclusive, both are shown. In FIG. 7 however the printing carriage 194 has a single vertical rack 206 designated No. 3 vertical rack, and this again is engaged by a precision tooth pinion which is driven by a servo motor tachogenerator 207. Similarly a second servo motor tachogenerator 208 is mounted on the printing carriage 194 and drives a pinion 209 which engages the upper horizontal rack 191.

No. 1 servo motor (207) is driven alternatively by a circuit No. 1 designated 212, or a circuit No. 2 designated 213. Change over switches 214 control the circuit. No. 2 servo motor (208) is driven by a circuit No. 3 designated 216. This is driven by an electrical resolver 219 through an amplifier 220, this constituting the No. 3 circuit, designated 216.

Throughout this device electrical resolvers are utilised, and a No. 1 resolver, designated 222 resolves the "Z" signal into the sine of the signal as $-z_1 \cos A$. This is direct coupled on its input side to the synchro on the sub-carriage 200.

No. 2 resolver is designated 223 and this produces the cosine of the signal reported from the synchro No. 2 on the sub-carriage 201 as $+y_1 \sin A$. The output of Nos. 1 and 2 resolves (222 and 223) are algebraically added by simply superimposing the voltages one upon the other and fed through an amplifier 225 in the circuit 212 (that is, No. 1 circuit).

The No. 4 resolver, designated 228, is coupled on its input side to circuit No. 1 and transforms the signal into $(-z_1 \cos A + y_1 \sin A) \cos B$. The output from the resolvers 219 and 228 (nos. 3 and 4) constitute the circuit 213 when fed through the amplifier 230, the output of resolver 219 being $x_1 \sin B$, so that the output fed through this amplifier is $$(-z_1 \cos A + y_1 \sin A) \cos B + x_1 \sin B$$

The printing carriage 194 has the servo motor 207 mounted on a sub-carriage 232, and this sub-carriage has a printing stylus 233 thereon, and it will immediately be seen that the servo motor No. 1 (207) in being responsive to circuit No. 2 (213) and circuit No. 3 (216) will enable the printing stylus to trace out a compound "tip" about the two angles A and B, while the servo motor No. 2 (208) is responsive to the X axis resolved signal from the resolver No. 3. Thus, the printing stylus immediately traces a full scale "tipped" view about the compound of the angles A and B.

The amplifier which amplifies the signal can be of any type but it is preferred that it be either magnetic or electronic.

It will be seen by those skilled in the art that a more sophisticated development of the example shown in FIG. 7 can be utilised to get great accuracy and also to provide the information required to punch a tape, or alternatively, to magnetise a magnetic tape. The electrical embodiment of FIG. 7 is therefore extended in the drawings, FIGS. 8, 9, 10, 11 and 12, wherein is illustrated a system which enables two projections to be made from two views of a drawing, and each projection can be tilted about one or two axes and scaled in selected ratios relative to the original. By the use of an automatic fine and coarse measuring system which will be described, high orders of accuracy can be held.

The mechanical arrangement is shown in FIGS. 9, 10, 11 and 12, which shows a table 101 provided with an input carriage 310 suitably mounted on guide rails, which is operated to extract data from the input drawing and an output carriage 311 similarly mounted which projects the tilted drawing and/or drives an encoder which encodes data on to a punched or magnetic tape in a suitable form.

Figure 9:
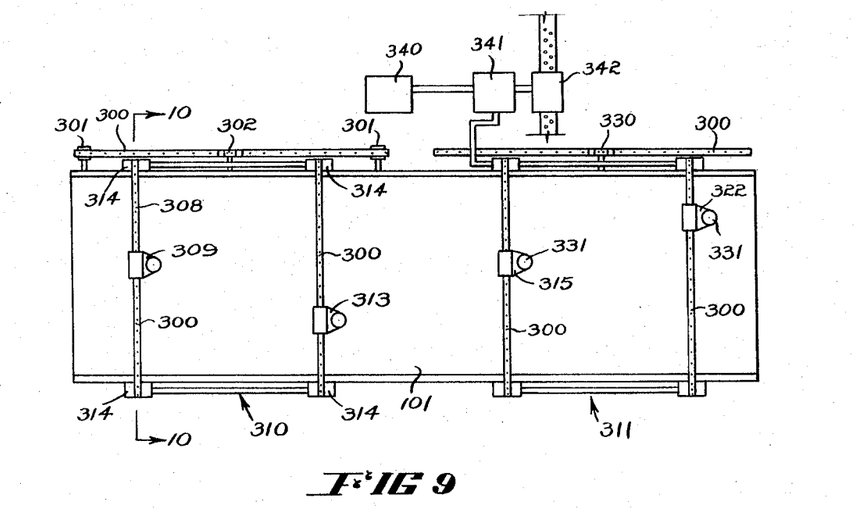
FIG. 9 shows the plan view of a table used for both input and output of the machine which has the circuit of FIG. 8.
Figure 10:
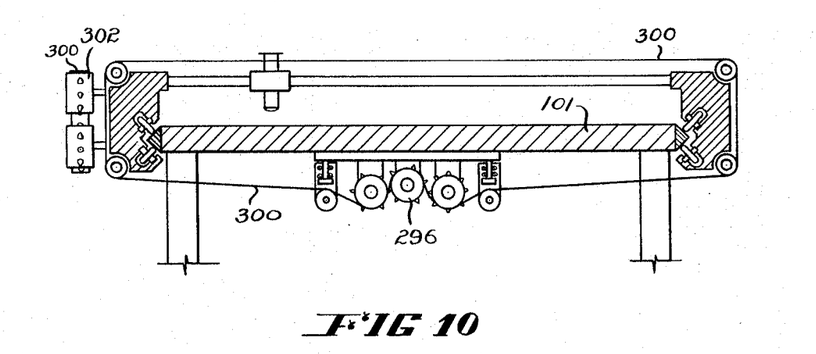
FIG. 10 is a section on line 10—10 of FIG. 9.

The input carriage 310 is connected to an endless loop of perforated band 300 which is carried on two rollers 301 journalled relative to the table 101. A sprocket drum 302 engages with the perforated band 300 so that movement of the carriage 310 in the $X_1$–O–X direction produces a rotation of the sprocket drum 302 analogous to the change in an $x_1$ dimension.

The vertical arms 308 of the input carriage 310 carry slidable saddles 309 and 313 incorporating a viewing system (for example, a microscope or other system employing a series of lenses) to enable outlines of input drawing to be followed by an operator. Each saddle 309 and 313 is attached to an endless loop of perforated bands 300 carried on rollers 314 mounted on the input carriage 310. Each perforated tape engages with a sprocket drum 296 and 297 (296 only being shown in FIGS. 10 and 11) also mounted on the input carriage. Thus movement of saddle 309 produces rotation of the sprocket drum 296 to produce rotation analogous to a change in a $z_1$ dimension and saddle 313 produces rotation of sprocket drum 297 analogous to a change in a $y_1$ dimension. The teeth 298 are of conical form and neatly engage in the apertures 299 of the bands 300 to provide accurate drive means.

Figure 11:
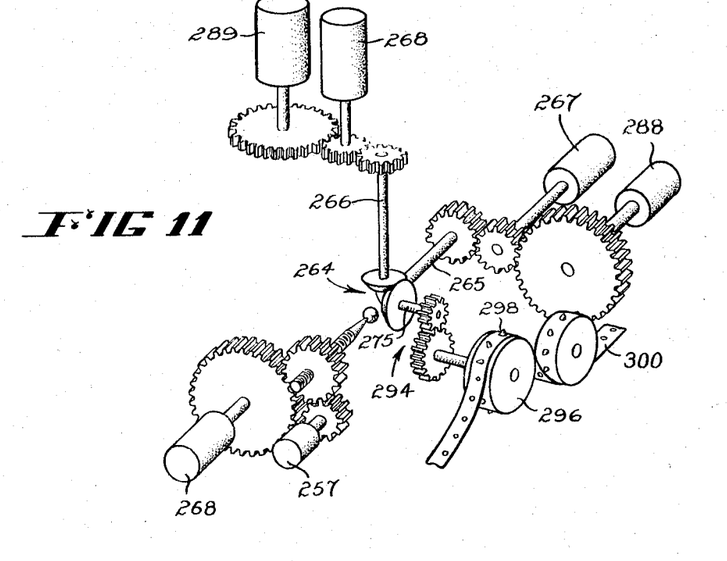
FIG. 11 is a diagrammatic perspective representation of the input mechanism showing a perforated band driving a drum which in turn drives two pairs of synchros through a resolver, and FIG. 12 similarly shows the output mechanism wherein a band is driven by a drum from a motor, the motor also being shown driving an encoder.

Each sprocket drum 296, 297 and 302 drives into variable ratio gear boxes 294, 295 and 303 respectively so that by setting the same ratio on each box a drawing scale change is effected (294 only is shown in FIG. 11).

Figure 8:
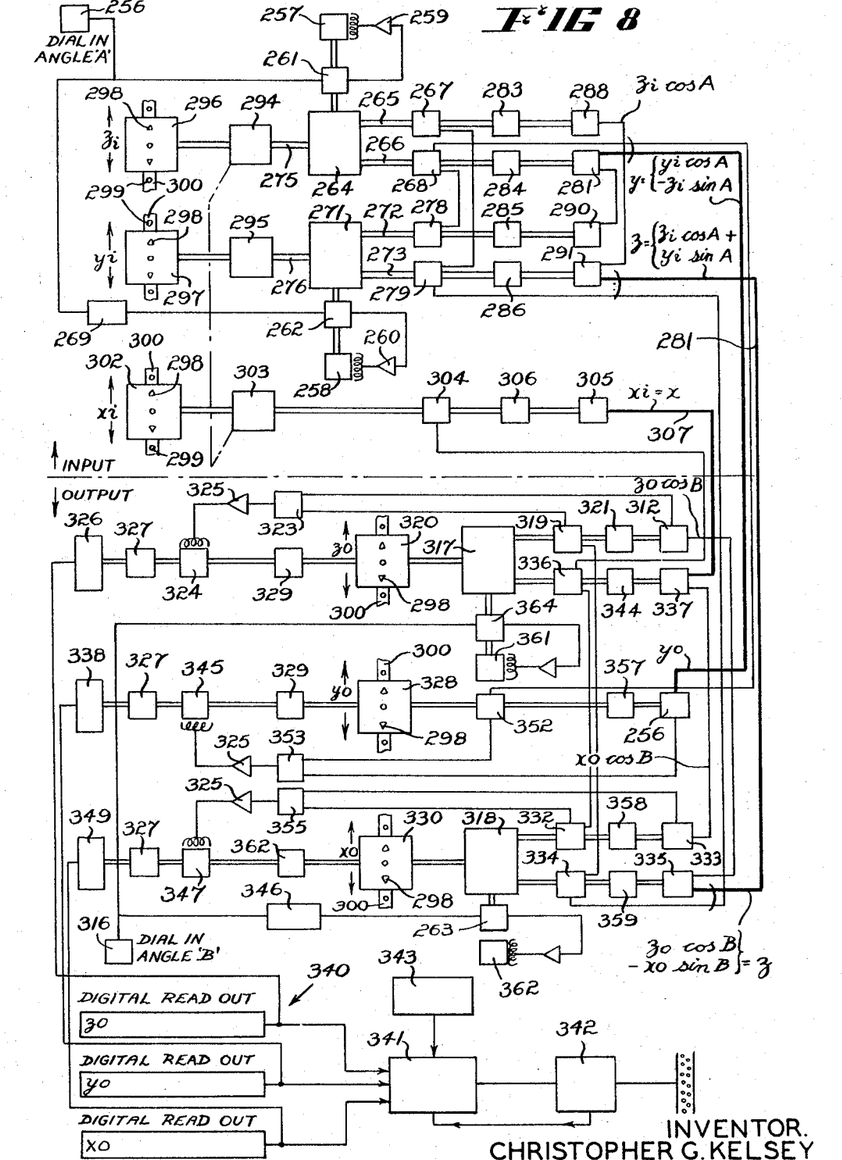
FIG. 8 shows the electrical and mechanical components of a more sophisticated machine capable of higher accuracy than the machine illustrated in FIG. 7, or in FIGS. 3, 4, 5 and 6, FIG. 8 being presented in block diagram form.

The output shafts 275 and 276 of the respective gearboxes 294 and 295 are coupled to ball resolvers 264 and 271 respectively. Each resolver has two output shafts, those for resolver 264 being designated 265 and 266 and those for resolver 271 being designated 272 and 273 (FIG. 8). The effect of the resolvers is to cause one output shaft to rotate through an angle proportional to the input angle multiplied by the cosine of a quantity set into the resolver while the other output shaft rotates through an angle proportional to the input angle multiplied by the sine of the same quantity. Thus the angular rotation of shaft 265 is proportional to the quantity $z_1 \cos A$, that of shaft 266 to $z_1 \sin A$, that of shaft 272 to $y_1 \cos A$, and that of shaft 273 to $y_1 \sin A$.

Mounted on shafts 265, 272 and the shaft from gearbox 303 are synchros 267, 278 and 304 respectively which produce electrical voltages representing the quantities $z_1 \cos A$, $y_1 \cos A$ and $x_1$ respectively. Differential synchros 268 and 279 are mounted on shafts 266 and 273 respectively and electrical connections are made between these synchros and the synchros 278 and 267 in such a way that the electrical outputs of 268 and 279 represent the quantities $(y_1 \cos A - z_1 \sin A)$ and $(y_1 \sin A + z_1 \cos A)$ which are also the quantities y and z.

Because the validity of this representation only extends over one revolution of the various shafts connected to the synchros and differential synchros, the assembly of above mentioned synchros, differential synchros, and wiring is known collectively as the fine input channel.

Mounted on the same shafts as synchros 267, 268, 278, 279 and the output shaft of gearbox 304 are respective gearboxes 283, 284, 285, 286 and 306 which connect to synchros and respective differential synchros 288, 281, 290, 291 and 305 which are interconnected in such a way as to produce electrical voltages representing the quantities x, y and z. However, because of the gearboxes, the range of representation covers the full range of variation of the quantities $x_1$, $y_1$ and $z_1$. For this reason, this assembly of synchros and differential synchros, and wiring is termed the coarse input channel.

Thus when the operators of the machine trace any line on the input drawing by following it with combined movements of the input carriage 310 and the saddles 309 and 313, the instantaneous co-ordinates of a point $x_1$, $y_1$ and $z_1$ on any line are transformed into fine and coarse electrical signals x, y and z corresponding to a tip through an angle A about axis $IX_1$–O–IX.

It will subsequently be shown that such movements of the input carriages and saddles will cause servo controlled movements of the output carriage 311 and its saddles 315 and 322 so as to generate instantaneous co-ordinates fine and coarse $x_o$, $y_o$ and $z_o$ and that these co-ordinates in turn correspond to the above mentioned fine and coarse $x_o$, $y_o$ and $z_o$ when tipped through an angle B about an output axis $OY_1$–O–OY (that is, output relative to first tip).

The output carriage 311 is identical to the input carriage 310 except that the saddles 315 and 322 carry solenoid operated pens 331 which are operated by a button (not shown) on the input carriage.

Figure 12:
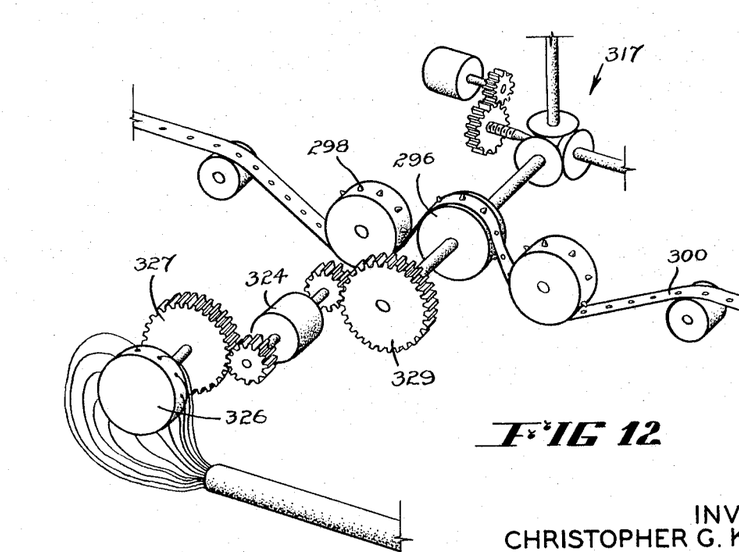

An endless perforated band 300 attached to the output carriage 311 and driven by sprocket drum 330 moves the carriage to produce $x_o$ dimensions. (The $x_o$ read-out is shown in FIG. 12, but the $z_o$ is similar and $y_o$ does not require a resolver.) Similarly saddles 315 and 322 are moved via bands 300 by rotation of drums 320 and 328 respectively to produce $z_o$ and $y_o$ dimensions respectively. Rotation of the drums 320, 328 and 330 is effected by output servo motors 324, 345 and 347 respectively.

In a similar manner to those on the input table the bands 300 on the output table are connected through drums, resolvers, and synchros to produce the quantities ($z_o \cos B - x_o \sin B$), $y_o$ and ($z_o \sin B + x_o \cos B$) represented by electrical voltages in fine and coarse channels.

When the output system is in its correct position, there will be no difference between these quantities and the quantities $x$, $y$ and $z$. Accordingly, the fine input channel is electrically connected to the fine output channel and the coarse input channel is electrically connected to the coarse output channel. If there is a difference in say, $z$, this causes voltages to appear on the outputs of synchros 319 and 312 which are coupled together by the gearbox 321. These voltages are supplied to 323 which is a sector switch or similar device which compares the amplitude of the coarse error voltage, which is the output of synchro 312, with a reference voltage and connects the coarse error voltage to amplifier 325 if the error voltage is greater than the reference. Otherwise the switch 323 connects the fine error voltage, which is the output of synchro 319, to the amplifier 325. Similar operations occur in the other two sector switches 353 and 355. The outputs of the three amplifiers 325 are fed respectively to motors 324, 345 and 347 which through gearboxes 329 drive the output drums 320, 328 and 330 in such a direction as to cause the error voltages to become zero, at which point the drums have assumed their correct position in respect to the input drums 296, 297 and 302.

A synchro 256 controls a pair of set up motors 257 and 258 through respective amplifiers 259 and 260, the synchros 261 and 262 forming portion of servo loops. The synchro 256 has the function of determining a first angle of "tip" A, and is associated with graduative means to provide a ready identification of the angle which is to be "tipped." The set up motor 257 is coupled to the resolver 264 through syncho 261. The resolver 271 is similarly driven but by the set up motor 258. Differential synchro 269 allows the setting of the resolver 271 to be varied slightly, in order that the accuracy may be improved.

In a similar fashion synchro 316 sets up resolvers 317 and 318 and determines the second angle of "tip" B.

Mechanically coupled to the output sprocket drums 320, 328 and 330 are encoders 326, 338 and 349 respectively by means of respective gearboxes 327.

The outputs from the encoders 326, 338 and 349 are "teed" to visual digital read-out designated 340 so that at any instant the dimension can be determined, while the output also enters a sequence programmer 341. In this embodiment the sequence programmer is of the type which includes a series of indexing switches which are operated by relays to put in order the sequence of tape punching signals from $x_o$, $y_o$, $z_o$ read-out. This can vary of course according to the format of tape used. The output of the sequence programmer feeds into a tape puncher 342, but this feeds back into the sequence programmer to control the order of punching. The auxiliary instructions 343 are in accordance with usual practice for giving instructions such as parabolic stop or start to the tape punching device.

Many portions of the circuit shown in FIG. 8 are simply repetitive, and the following schedule sets out equivalent elements of circuit parts:

Synchro 352 is equivalent to synchro 304
Gearbox 357 is equivalent to gearbox 306
Synchro 356 is equivalent to synchro 305
Synchro 332 is equivalent to synchro 319
Gearbox 358 is equivalent to gearbox 321
Synchro 333 is equivalent to synchro 312
Differential 334 is equivalent to differential 268
Synchros 336 are equivalent to synchros 279
Gearboxes 344 and 359 are equivalent to gearboxes 284 and 286
Differential 337 is equivalent to differential 281
Synchros 335 are equivalent to synchros 291
Synchros 363 and 364 are equivalent to synchros 261 and 262
Set up motors 361 and 362 are equivalent to set up motors 257 and 258
Synchro 346 is equivalent to synchro 269

It may be noted that the synchro 346 constitutes realignment adjustment means.

From the above description it will be evident that tapes may be used in lieu of drawings for storage of data.

What I claim is:

1. A drafting data processing machine comprising:
   a surface,
   a pair of tracer means, the tracer means and surface being movable relative to each other,
   transmission means operatively coupled to each of the tracer means and arranged to transmit tracer movement,
   resolvers operatively coupled to said transmission means,
   means coupling the output of the resolvers in an algebraic sum, and
   print-out means operable in response to the sum.

2. A drafting data processing machine comprising:
   a drafting table having a flat surface, track means on the table,
   a carriage movable along and guided by the track means,
   a pair of tracer means on the carriage each movable relative to the carriage in a direction at right angles to the direction of travel of the carriage,
   a resolver operatively coupled to each of the tracer means and arranged to transmit a proportion of tracer movement relative to the carriage,
   transmission means coupled to the carriage and arranged to transmit carriage movement, means coupling the transmitted output of the resolvers and carriage movement in an algebraic sum or difference, and
   a print-out means operable in response to the sum or difference.

3. A drafting data processing machine comprising:
   a drafting table having a flat surface,
   track means on the drafting table,
   a carriage movable along and guided by said track means, said carriage having guide means disposed parallel to each other and at right angles to said track means,
   a pair of tracer means each movable along the guide means of the carriage, each tracer means including a series of lenses,
   a resolver coupled to each of the tracer means and arranged to transmit a proportion of tracer movement,
   transmission means coupled to the carriage and arranged to transmit the whole of carriage movement, means coupling the output of the resolvers in an algebraic sum or difference, and print-out means operable in response to the carriage movement and also to said sum or difference.

4. A drafting data processing machine comprising:
a surface,
a pair of tracer means movable over the surface,
a series of pivoted arms coupled to each of the tracer means constituting a resolver,
telescopic link means coupled to the pivoted arms and arranged to transmit the output of the resolvers in an algebraic sum or difference, and
print-out means operatively coupled to the telescopic link means and movable in response to said sum or difference.

5. A drafting data processing machine comprising:
a drafting board,
a track secured to and extending along the drafting board,
a movable support frame having horizontal and vertical members,
wheels on the support frame engaging the track and guiding the support frame for movement along the drafting board,
a pair of resolvers, each resolver comprising a first saddle slidable over a respective said vertical member, a primary arm pivoted at its one end to the first saddle, a secondary control arm pivoted at its one end to the second end of the primary arm and at its other end to the movable support frame, and a pair of spaced pivoted arms each pivoted at one end to a sleeve adjustably securable along the secondary control arm and at its other end to a further saddle slidable along the vertical member, the primary and pivoted arms being positionable parallel to each other,
tracer means coupled to each said first saddle,
telescopic rods pivoted to corresponding said further saddles thereby interconnecting said resolvers,
a pair of output saddles slidable over a third said vertical member, each output saddle having a respective said telescopic rod pivoted thereto, and
print-out means on each output saddle.

6. A drafting data processing machine comprising:
a drafting board,
a track secured to and extending along the drafting board,
a support frame movable along and guided by the track, the movable support frame having horizontal and vertical members, a pair of resolvers, each resolver comprising a first saddle slidable over a respective said vertical member, a primary arm pivoted at its one end to the first saddle, a secondary arm pivoted at its one end to the second end of the primary arm and its other end to the movable support frame, and a pair of spaced pivoted arms each pivoted at one end to a sleeve adjustably securable along the secondary control arm and at its other end to a further saddle slidable along the vertical member, the primary and pivoted arms being positionable parallel to each other,
a microscope coupled to each said first saddles,
telescopic rods pivoted to corresponding said further saddles thereby interconnecting said resolvers,
a pair of output saddles slidable over a third said vertical member,
each output saddle having a respective said telescopic rod pivoted thereto,
a solenoid on each said output saddle, and
print-out means constituted by a pen or pencil on the armature of each solenoid.

7. A drafting data processing machine comprising:
a drafting table having a flat surface,
track means extending along the drafting table,
a support frame movable along and guided by the track means over the drafting table,
the movable support frame having vertical track means thereon,
tracer means movable along and guided by each said vertical track means on the support frame,
a pair of ball type resolvers mechanically coupled to said tracer means and movable in response to movement thereof, each resolver having two output shafts one of which rotates through an angle proportional to the sine and the other of which rotates through an angle proportional to the cosine of the input angular rotation of the resolver,
means coupling the output of the resolvers in an algebraic sum, and
print-out means operable in response to the sum or difference.

8. A drafting data processing machine comprising:
a drafting table having a flat surface,
track means extending along the drafting table,
a support frame movable along and guided by the track means, the support frame having a pair of guide members parallel to each other and disposed at right angles to said track means,
a pair of tracer means each movable along and guided by said guide members,
a ball type resolver operatively coupled to each of the tracer means, each ball type resolver having an input shaft and two output shafts, the input shaft rotating through an angle proportional to translational displacement along the guide members, one of the output shafts rotating through an angle proportional to the sine and the other proportional to the cosine of the angular rotation of the input shaft,
electric signal transmission means responsive to the angular rotation of each output shaft of each resolver,
further electric signal transmission means coupled to the movable support frame and arranged to transmit a signal proportional to translational displacement of the support frame,
electrically operated read-out means including three channels, two of said channels containing further ball type resolvers, said signal transmitting and read-out means being responsive to one or more of the following groups of equations:

$z = z_1 \cos A + y_1 \sine A$
$y = z_1 \sine A + y_1 \cos A$
$x = x_1$
$z_0 = z \cos B + x \sine B$
$y_0 = y$
$x_0 = -z \sine B + x \cos B$
$z = z_0 \cos B - x_0 \sine B$
$y = y_0$
$x = z_0 \sine B + x_0 \cos B$ A representing a first angle of tip and B a second angle of tip relative to Cartesian co-ordinates, $X_1$–O–X, $Y_1$–O–Y and $Z_1$–O–Z.

9. A drafting data processing machine according to claim 8 wherein the print-out means consists of three servo-motor driven print-out devices, one for the $x_0$ component, one for the $y_0$ component and the other for the $z_0$ component.

10. A drafting data processing machine according to claim 8 wherein the output electrical voltage drives print-out means consisting of three servo-motor driven print-out devices, one for the $x_0$ component, one for the $y_0$ component and one for the $z_0$ component.

11. A drafting data processing machine according to claim 8 wherein the output of the resolvers on said tracer means includes a fine and coarse electrical voltage means separately transmitted and separately controlling each of a plurality of servo-motor driven print-out devices through a sector switch.

12. The method of processing data from a pair of drafted views which comprises the steps:
placing the views on a surface,
moving a pair of tracer means over the line of the views,
transmitting movement of the tracer means directly in one direction,
resolving tracer movement in a direction at right angles to said first direction to a fraction thereof corresponding to the sine of an angle of tip for one of the tracer means and the cosine of the angle of tip for the other of the tracer means, and
printing out the algebraic sum of the outputs.

13. The method of processing data from a pair of orthographic drafted views which comprises the steps:
arranging the views with a common axis of Cartesian co-ordinates extending in one direction,
securing the views to a surface when so arranged,
moving a pair of tracer means over the lines of the views simultaneously of said direction and independently in a direction at right angles thereto,
resolving said movement in said direction at right angles, and
printing out the algebraic sum of the movements.

14. The method of processing data from a pair of draft views which comprises the steps:
arranging the views with a common axis of Cartesian co-ordinates extending in one direction,
securing the views on a surface when so arranged,
moving each of a pair of tracer means simultaneously in said direction and independently in a direction at right angles thereto,
resolving the movement in the said direction at right angles thereto into electrical signals,
transmitting a further electrical signal proportional to movement in the direction of the common axis,
transmitting said signals separately in fine and coarse components to a sector switch, and
driving print-out means responsively to said signals.

15. The method of processing data from a pair of drafted orthographic views which comprises the steps:
arranging the views with a common axis of Cartesian co-ordinates extending in one direction,
securing the views on a surface,
moving a pair of tracer means over the lines of the views simultaneously in the direction of the common axis but independently in a direction at right angles thereto,
transmitting the movement in the direction of the common axis directly,
transmitting resolved movement of the tracer means in a direction at right angles to said common axis,
algebraically adding the outputs, and
printing out the outputs transmitted, in accordance with one or more of the following groups of equations:

$z = z_i \cos A + y_i \sine A$
$y = -z_i \sine A + y_i \cos A$
$x = x_i$
$z_0 = z \cos B + x \sine B$
$y_0 = y$
$x_0 = -z \sine B + x \cos B$
$z = z_0 \cos B - x_0 \sine B$
$y = y_0$
$x = z_0 \sine B + x_0 \cos B$ No references cited.

LEONARD FORMAN, *Primary Examiner.*